United States Patent [19]
Nakazawa

[11] Patent Number: 5,628,035
[45] Date of Patent: May 6, 1997

[54] MOVING BODY POSITION DETECTING DEVICE

[75] Inventor: Isao Nakazawa, Kanagawa-ken, Japan

[73] Assignee: Canon Kabushiki Kaisha, Tokyo, Japan

[21] Appl. No.: 533,319

[22] Filed: Sep. 25, 1995

[30] Foreign Application Priority Data

Sep. 28, 1994 [JP] Japan .................................. 6-233087

[51] Int. Cl.⁶ .................................................. G03B 1/18
[52] U.S. Cl. .......................................... 396/87; 396/543
[58] Field of Search ........................... 354/195.1, 195.12, 354/400; 324/704, 713, 714, 715, 723, 724; 340/870.38; 396/87, 543

[56] References Cited

U.S. PATENT DOCUMENTS

| Re. 34,453 | 11/1993 | Kamitani et al. | 354/195.1 |
|---|---|---|---|
| 4,504,832 | 3/1985 | Conte | 340/870.32 |
| 4,994,842 | 2/1991 | Itoh et al. | 354/402 |
| 5,023,645 | 6/1991 | Yoshida et al. | 354/400 |
| 5,155,515 | 10/1992 | Kohmoto et al. | 354/195.1 |
| 5,170,201 | 12/1992 | Akiyama et al. | 354/400 |
| 5,408,286 | 4/1995 | Kashiwaba | 354/195.1 |

*Primary Examiner*—Safet Metjahic
*Assistant Examiner*—Eddie C. Lee
*Attorney, Agent, or Firm*—Robin, Blecker, Daley & Driscoll

[57] ABSTRACT

A moving body position detecting device is provided with at least three contacts and at least three conductors which are in contact respectively with the three contacts, connected in series to each other and disposed in parallel to each other, for detecting the position of a moving body according to the relative positional relationship between the three contacts and the three conductors.

35 Claims, 8 Drawing Sheets

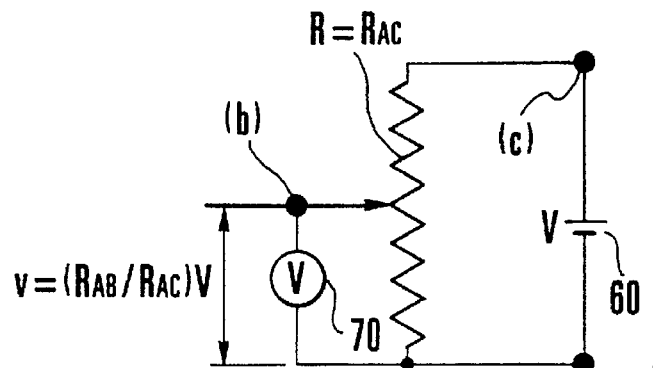
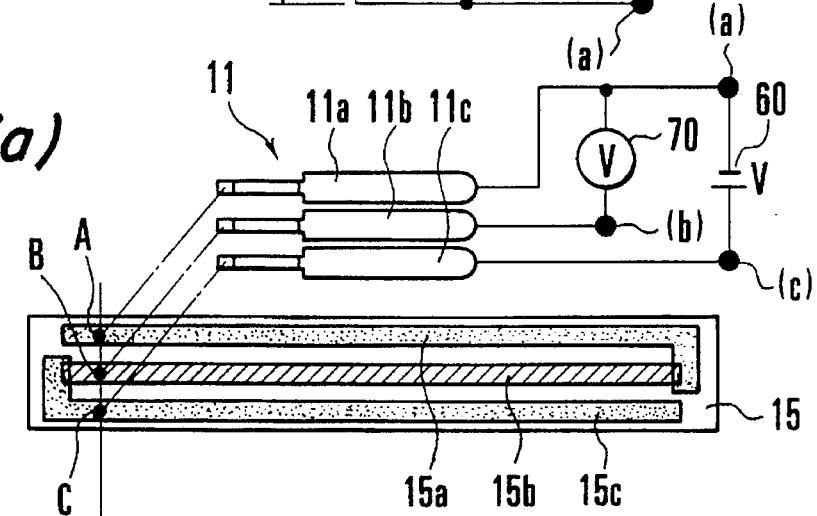
FIG. 3(a)
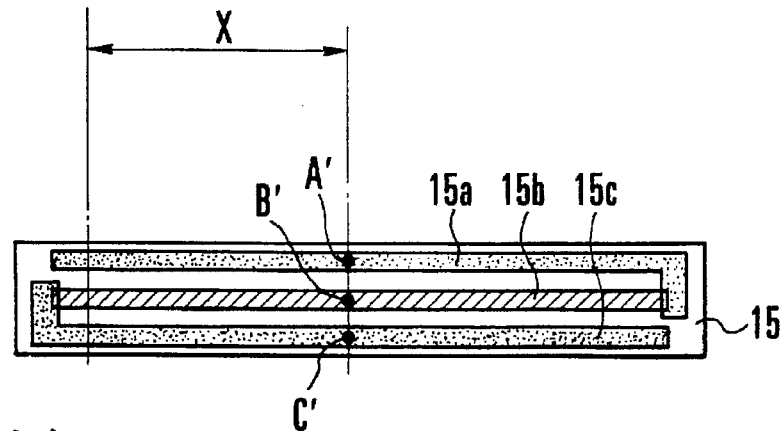
FIG. 3(b)

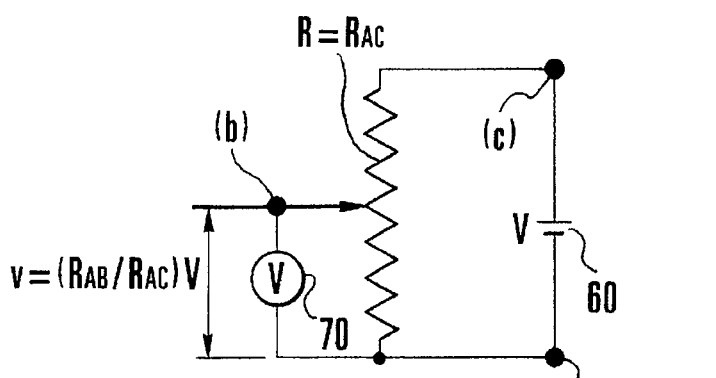
FIG.4(a)
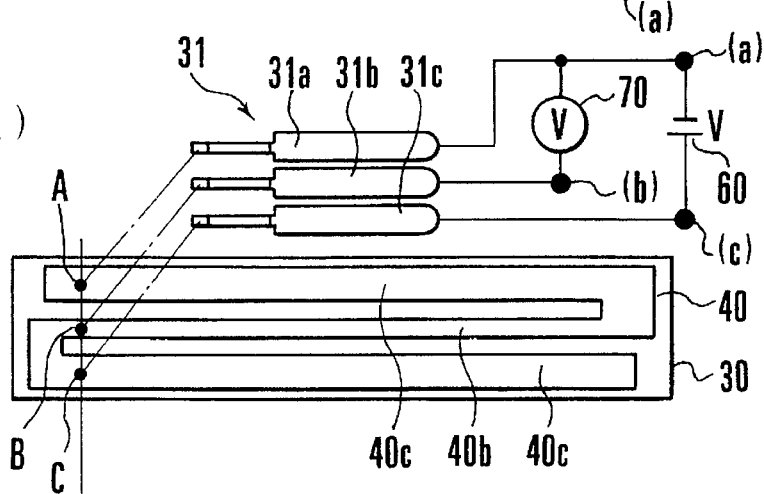
FIG.4(b)
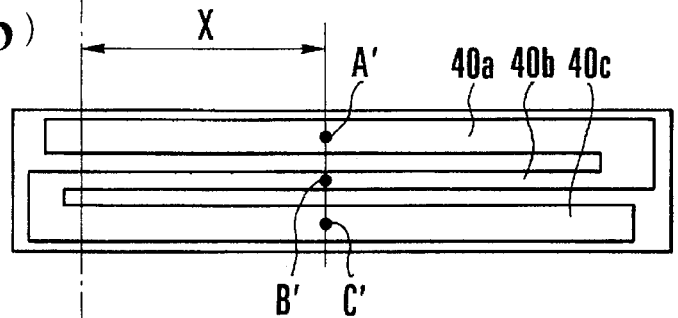
FIG.4(c)
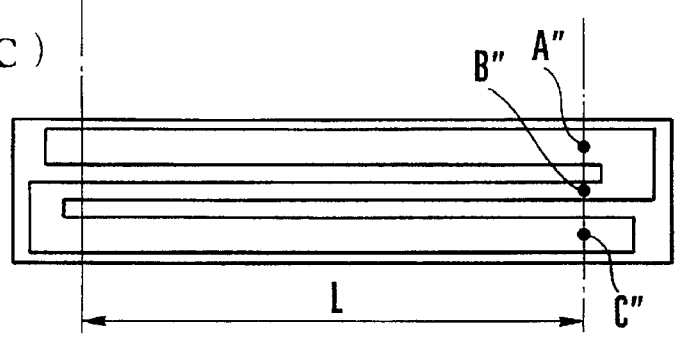

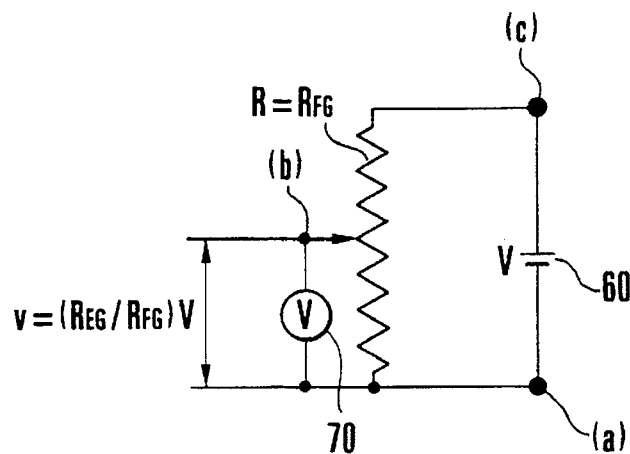
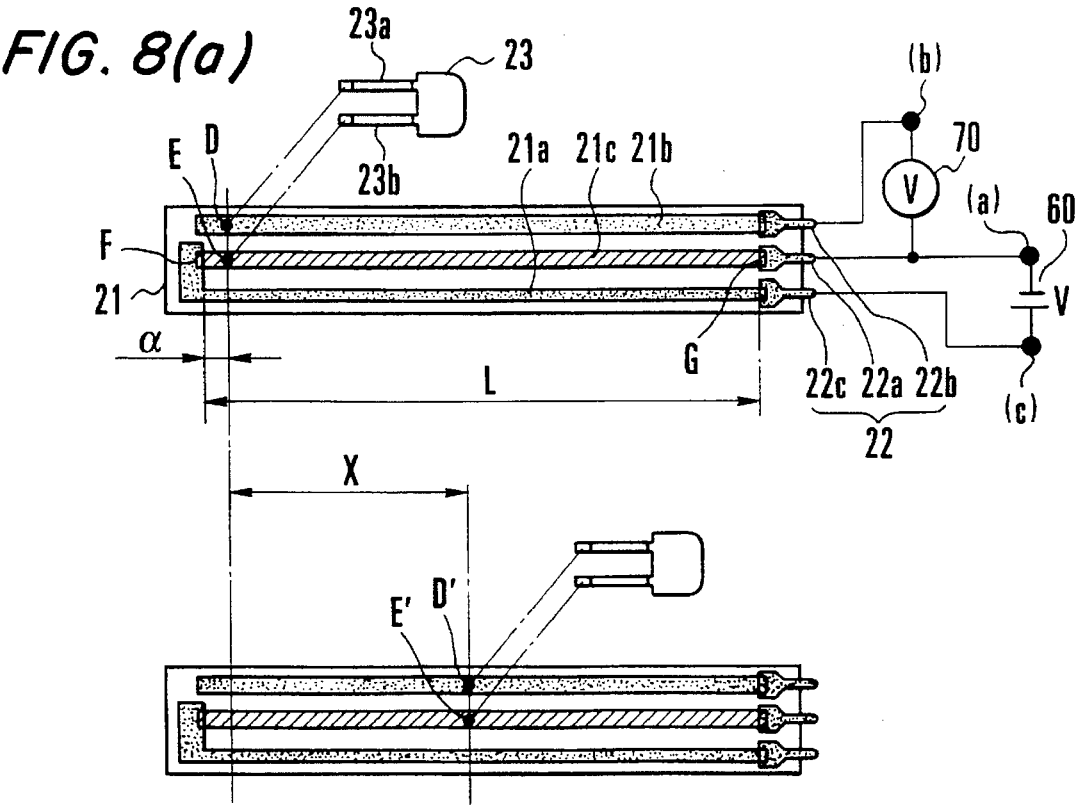
FIG. 8(a)
FIG. 8(b)

MOVING BODY POSITION DETECTING DEVICE

BACKGROUND OF THE INVENTION

1. Field of the Invention

This invention relates to a moving body position detecting device and more particularly to a detecting device adapted for detecting the moving position of an optical element such as a lens or the like in an optical apparatus such as a camera.

2. Description of the Related Art

Cameras are arranged these days to automatically perform both power varying and focusing actions, which are carried out by shifting the positions of optical elements such as lenses. Hence, cameras are provided with devices for detecting the positions of the optical elements to be used for automatically performing these actions.

The position detecting devices arranged in the conventional cameras to detect, for example, the position of a power varying optical system include two types.

(a) Sliding Contact (Coded) Type Detecting Device

In the device of this type, a flexible printed circuit board on which a coded conductive pattern is formed is secured to the outer circumferential part of a zoom ring of the lens barrel of the camera or the like. A brush (conductive sliding contact pieces or terminals) arranged to come into sliding contact with the conductive pattern is secured to an immovable part of the lens barrel. When the zoom ring is rotated, a voltage which corresponds to the position of the brush on the conductive pattern is detected as a binary coded signal.

An example of the conventional detecting device of this type is described with reference to FIGS. 5 and 6 as follows. Referring to FIG. 5, a zoom lens barrel 1 is arranged to support a zoom lens and to be helically movable in the direction of an optical axis, i.e., to be axially movable while rotating. A motor 2 is arranged to drive the lens barrel 1. A reduction gear 3 has an output gear 3a. A zoom driving ring 4 is fitted on the lens barrel 1 through a helicoid and is arranged to be rotatable only. A ring gear 4a is fixed to the outer circumferential part of the zoom driving ring 4 to be constantly in mesh with the output gear 3a of the reduction gear 3. A pattern plate 5 which is a flexible printed circuit board or the like is secured to the outer circumferential surface of the zoom driving ring 4 and has a conductive pattern 5a formed on its surface as shown in FIG. 6. A brush 6 is secured to a stationary member (not shown) and is arranged to be in sliding contact with the conductive pattern 5a. As shown in FIGS. 5 and 6, the brush 6 consists of five conductive sliding contact pieces (or conductive terminals) 6a. One of the five contact pieces 6a is arranged to be a common contact piece (a common terminal) and to be constantly in contact with the conductive pattern 5a. Other conductive sliding contact pieces 6a are arranged in such a way as either to come into contact or not to come into contact with the conductive pattern 5a. A detecting circuit which is not shown is arranged to detect the output of the conductive sliding contact piece 6a which is in contact with the conductive pattern 5a as a digital signal "1" and that of the conductive sliding contact piece which is not in contact with the conductive pattern 5a as a digital signal "0". In other words, the rotating position of the zoom driving ring 4 can be detected as a binary signal of four bits by using the four conductive sliding contact pieces 6a excluding the common contact piece 6a. Thus, since the output of each of the four conductive sliding contact pieces 6a is in a state of either "1" or "0", the number of possible combinations of the output states of the four conductive sliding contact pieces 6a is $2^4=16$. Hence, 16 positions can be detected by the detecting device of this type. However, the conventional detecting device of this type has the following drawbacks.

(1) The signal outputted from the device would remain unchanged if the states of contact and noncontact do not vary even when the relative positions of the conductive pattern and the conductive sliding contact pieces vary. Under such a condition, detection values are obtainable only in an intermittent manner and continuous feedback control becomes impossible since detection values cannot be continuously obtained. In this case, therefore, zoom control is performed virtually in a stepwise manner.

(2) The number of detecting positions must be increased for obtaining continuous detection values. In order to increase the detecting positions, the number of the conductive patterns and that of the conductive sliding contact pieces of the brush must be increased. Then, such an arrangement necessitates an increase in width of the conductive pattern plate and the brush, and thus results in an increase in cost and space required.

(3) Since positional changes cannot be detected continuously, use of a highly advanced mode of control, such as predictive control, is hardly possible.

(4) Since there are errors in mounting the conductive pattern plate and the brush in addition to some manufacturing errors, position detecting signals tend to deviate from actual lens positions. Therefore, the mounting positions of the conductive pattern plate and the brush must be adjusted, particularly, in a case where a lens position must be detected with absolute accuracy, such as an end position obtained with the lens barrel retracted, a wide-angle end position or a telephoto end position. However, adjustment work on their mounting positions requires time and labor and thus causes an increase in cost. Besides, since the width of each of stepped zones at the lens positions mentioned above is determined by the accuracy of the conductive pattern, it is adjustable only at a single point.

(b) Noncontact (Encoder) Type Detecting Device.

In the case of the noncontact type detecting device, the conductor pattern plate 5 is not applied to the outer circumferential surface of the zoom driving ring 4 as shown in FIG. 5. Instead, a known pulse plate (coding plate) on which a bright-and-dark pattern is formed is mounted on a shaft of the gear 3a or the like. A noncontact type detector such as a photo-interrupter which generates a pulse signal according to the bright-and-dark pattern is mounted on a fixed member. The rotation of the zoom driving ring is detected in a noncontact manner through the rotation of the gear.

The detecting device of the type described in the paragraph (b) above is capable of detecting the amount of rotation of the zoom driving ring more finely than the detecting device of the type described in the paragraph (a). However, the detecting device of the paragraph (b) also has the following drawbacks.

(1) The device consisting in combination of the known pulse plate and the photo-interrupter is in general an incremental encoder and is, therefore, incapable of detecting an absolute position, although the device can detect amounts of changes in position. The device thus necessitates use of at least another detecting means for detecting a datum position.

(2) If a zooming action is repeated within an area without passing through the above-stated datum position, an accumulated error becomes too large for accurate lens positioning.

(3) The lens must be moved to the above-stated datum position immediately after replacement of the battery of the camera or upon return from an abnormal state. If not, lens positioning becomes very inaccurate thereafter.

(4) Since the pulse plate is mounted either on a gear or a shaft of a power transmission system, it is impossible to detect the true position or true amount of movement of the lens. In other words, there is some mechanical play in the gear train or the like of the power transmission system and the signal outputted from the detecting device includes an amount of error which corresponds to the amount of the play. However, it is difficult to remove the error from the signal. When the lens position is changed by a force applied from outside, therefore, the result of lens position control thereafter includes an error, making accurate positioning impossible.

(c) Known devices for detecting the moving amount of a focusing lens, not a zoom lens, include a device disclosed, for example, in U.S. Pat. No. 33,185. This focusing-lens-moving-amount detecting device is arranged to detect the moving amount of a focusing lens by having a brush in sliding contact with a resistance body arranged along the outer circumferential surface of a focus ring to give distance information and by detecting a voltage which corresponds to the position of the brush on the resistance body. This detecting device, however, also has the following drawbacks.

(1) According to the electrical arrangement of the detecting device, it is impossible to obtain a detection value in linear proportion to the amount of movement of the brush relative to the resistance body.

(2) Since a power supply must be connected directly to the resistance body, it is necessary to have the power supply mounted on the rotating focus ring or to arrange the focus ring to include an electric connection part. However, the arrangement of having the electric connection part or the power supply mounted on the side of the rotating body not only results in a complex construction but also tends to cause electrical troubles.

To eliminate the intrinsic drawbacks of the conventional position detecting devices described, a novel position detecting device has been proposed in Japanese Laid-Open Patent Application No. HEI 5-208366. The device proposed is arranged to use a linear potentiometer as shown in outline in FIGS. 7 and 8. The arrangement is as described below with reference to FIGS. 7 and 8.

FIG. 7 is an exploded oblique view of the linear potentiometer. Referring to FIG. 7, a base plate 20 is provided for a circuit board 21. The circuit board 21 is provided with conductive bodies 21a and 21b and a resistance body 21c, which are formed on the surface of the circuit board 21. Three terminals 22 are connected respectively to the conductive bodies 21a and 21b and the resistance body 21c. A brush 23 consists of two sliding contact pieces 23a and 23b, which are arranged to slide respectively over the conductive body 21b and the resistance body 21c. The sliding contact pieces 23a and 23b are short-circuited to each other and are mounted on a sliding member 24. The sliding member 24 is provided with a protruding part 24a. The protruding part 24a is slidably inserted into a slot part 25a formed in a casing 25 and is arranged to be movable in the longitudinal direction of the slot part 25 relative to the casing 25, i.e., in the longitudinal directions of the conductive bodies 21a and 21b and the resistance body 21c. The casing 25 is connected to the base plate 20 in such a way as to have the sliding member 24, the sliding contact pieces 23 and the circuit board 21 sandwiched in between the casing 25 and the base plate 20.

As shown in FIG. 8, the three terminals 22 are connected respectively to the ends of the conductive bodies 21a and 21b and the resistance body 21c and also to points (a), (b) and (c) of a detecting circuit (an equivalent circuit of the linear potentiometer). A resistor R is a total resistance $R_{FG}$ between the two ends F and G of the resistance body 21c. A constant voltage source 60 (having an output voltage V) is connected to the resistor R (i.e., between the terminals 22a and 22c) so as to apply the constant voltage V across both ends of the resistor R. The terminal 22b is connected to a moving terminal which is arranged to slide over the resistor R.

With a distance between the two ends F and G in the arrangement described above assumed to be L, a voltage v to be detected at the point (b) of the detecting circuit (i.e., at the terminal 22b) when the sliding contact pieces 23a and 23b are in contact with the resistance body 21c and the conductive body 21b at points D and E located at a distance $\alpha$ from the point F can be expressed as:

$$v=\{(L-\alpha)/L\}V=(1-\alpha/L)V$$

When the sliding member 24 and the sliding contact pieces 23a and 23b move from the positions D and E along and relative to the resistance body 21c and the conductive body 21b as much as a distance X to reach positions D' and E', the voltage v' which is detected at the point (b) of the detecting circuit can be expressed as:

$$\begin{aligned}v' &= \{(L-\alpha-X)/L\}\,V = \{1-(\alpha/L)-(X/L)\}V \\ &= v-(X/L)V\end{aligned}$$

In other words, since the voltage v' detected at an arbitrary point is in linear proportion to the moving distance X, the positions of the sliding contact pieces 23a and 23b (which represent the position of a moving body) can be directly detected. The moving body position detecting device of the kind using the linear potentiometer described above thus has the following advantages:

(1) The absolute positions of the moving body can be continuously detected.

(2) The device requires use of only three electrical connection pins, which are fewer than the pins necessary for the conventional detecting device. (Five connection pins are required for the above-stated coded type detecting device, assuming that it is of a 4-bit, 16 position type; and four connection pins and the datum position detecting means plus connection pins for the datum position detecting means are required in the case of the above-stated encoder type detecting device).

However, the above-stated device disclosed in Japanese Laid-Open Patent Application No. HEI 5-208366 also has the following problems which remain to be solved.

(1) Since the linear potentiometer is adapted for detecting a moving body making a linear motion, use of the device in detecting a rotating position of a rotary body necessitates a motion converting mechanism for converting the rotating motion into a linear motion. As a result, space necessary for the detecting system of the device increases and the cost of the device as a whole also increases by the cost of the motion converting mechanism.

(2) In a case where the brush 23 is mounted on the moving body while the circuit board 21 is mounted on a stationary body, the electrical component part is located on the side of the stationary body. Therefore, in such a case, there arises no problem with respect to electrical connection as an electrical connection part for connecting the resistance body and the conductive body on the circuit board 21 to the power supply and voltage detecting means does not move. However, in the case of such an optical apparatus as a camera or the like, the arrangement of mounting a protruding matter such as the brush on the moving body or on a rotating body not only necessitates a large space around the moving or rotating body but also causes a mass unbalance of the moving body and an increase in size.

(3) In a case where the brush 23 is mounted on the stationary body while the circuit board 21 is mounted on the moving body, conversely to the above, the power supply and the voltage detecting means which are to be electrically connected to the resistance body and the conductive body on the circuit board 21 must be also mounted on the moving body. This arrangement, however, causes an increase in mass of the moving body and is not desirable also in respect of the design of mechanism of the device.

Further, if the circuit board 21 is mounted on the moving body while the power supply and the voltage detecting means are mounted on a stationary body, the electrical connection part for connecting the resistance body and the conductive body on the circuit board to the power supply and the voltage detecting means moves as the moving body moves. That arrangement is, therefore, also not desirable.

SUMMARY OF THE INVENTION

It is one aspect of this invention to provide a moving body position detecting device which is of a simple structure and yet is capable of accurately detecting the position of a moving body. The moving body position detecting device arranged in accordance with this invention is provided with at least three contacts and at least three conductors which are in contact respectively with the three contacts, connected in series to each other and disposed in parallel to each other, for detecting the position of a moving body according to the relative positional relationship between the three contacts and the three conductors.

The above and other aspects of this invention will become apparent from the following detailed description of preferred embodiments thereof taken in connection with the accompanying drawings.

BRIEF DESCRIPTION OF THE DRAWINGS

FIGS. 3(a) and 3(b) show a part of mechanical arrangement with an electrical equivalent circuit of a moving body position detecting device which is arranged according to this invention as a second embodiment thereof.

FIGS. 4(a), 4(b) and 4(c) show a part of mechanical arrangement with an electrical equivalent circuit of a moving body position detecting device which is arranged as a third embodiment of this invention.

FIGS. 8(a) and 8(b) show the mechanical arrangement of essential parts of the linear potentiometer of FIG. 7 together with an electrical equivalent circuit.

DETAILED DESCRIPTION OF THE PREFERRED EMBODIMENTS

Preferred embodiments of this invention are described below with reference to the drawings.

(First Embodiment)

A first embodiment of this invention is described with reference to FIGS. 1 and 2 as follows.

Figure 1:
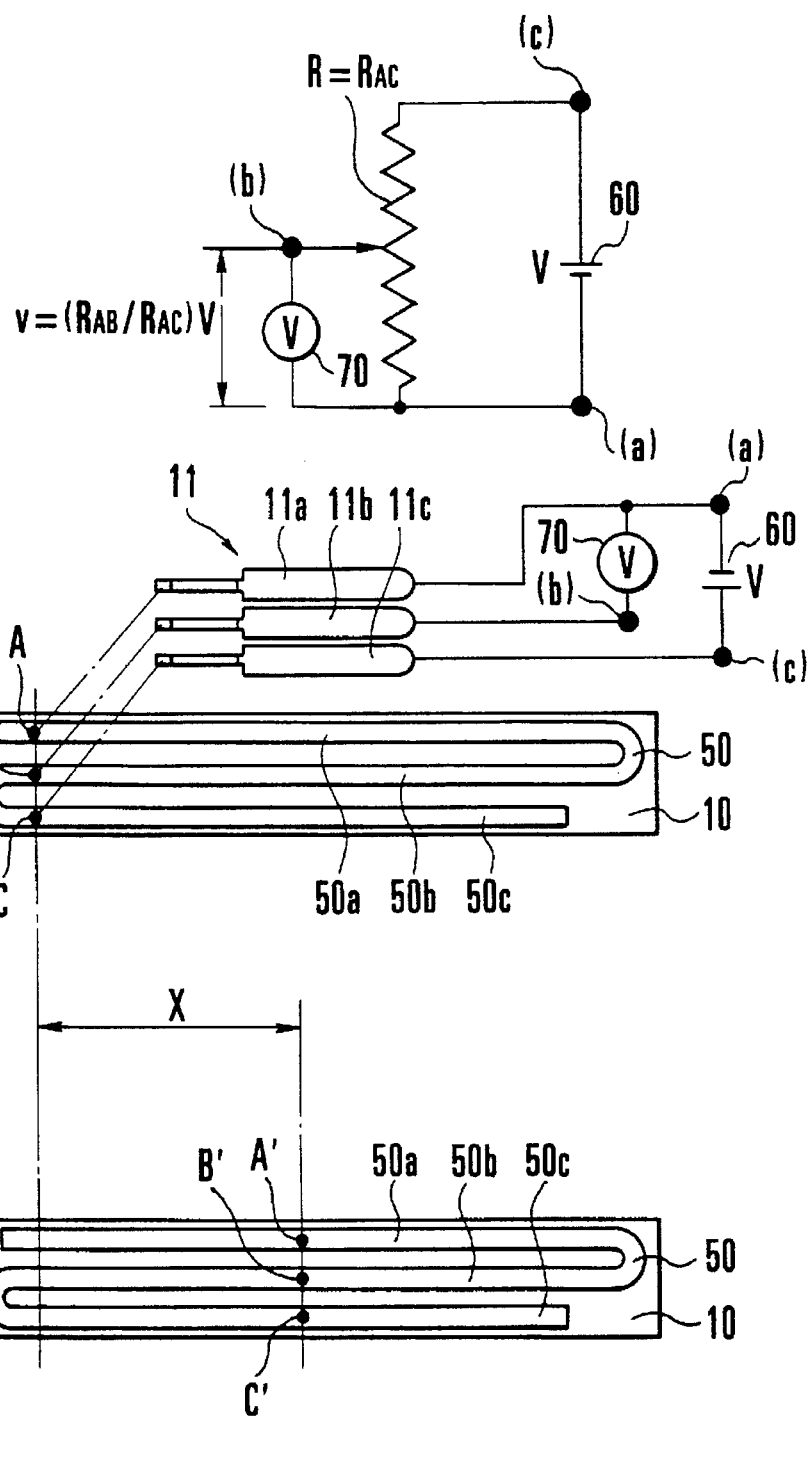
FIGS. 1(a) and 1(b) show a part of mechanical arrangement with an electrical equivalent circuit of a moving body position detecting device which is arranged according to this invention as a first embodiment thereof.

FIG. 1 shows the arrangement of a moving body position detecting device which is the first embodiment of this invention. FIG. 2 is an oblique view showing in outline the arrangement of essential parts of a zoom lens mechanism of a camera which is provided with the moving body position detecting device for detection of zoom positions.

Figure 2:
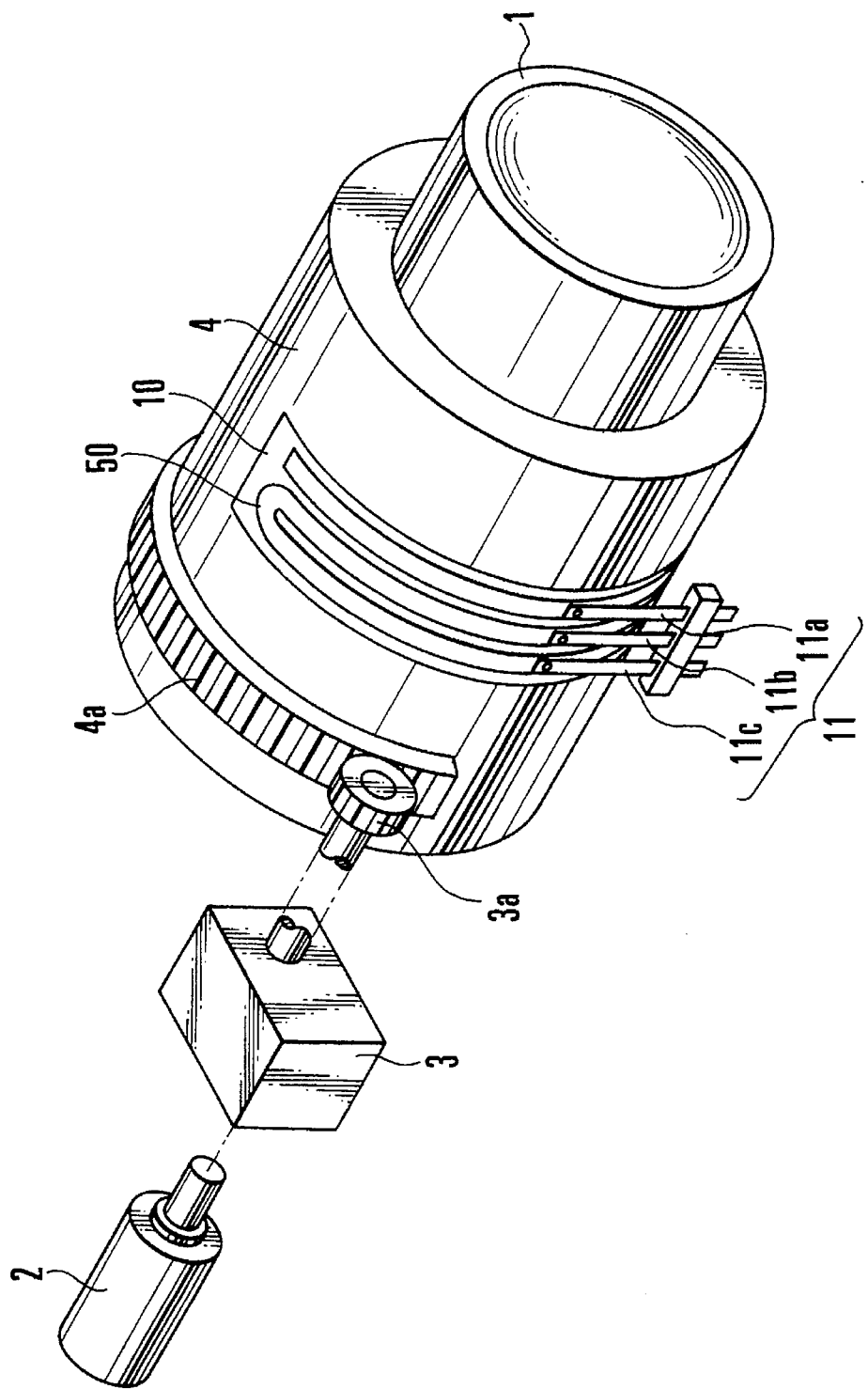
FIG. 2 is an oblique view showing in outline the arrangement of a zoom lens mechanism of a camera equipped with the moving body position detecting device of FIG. 1.
Figure 5:
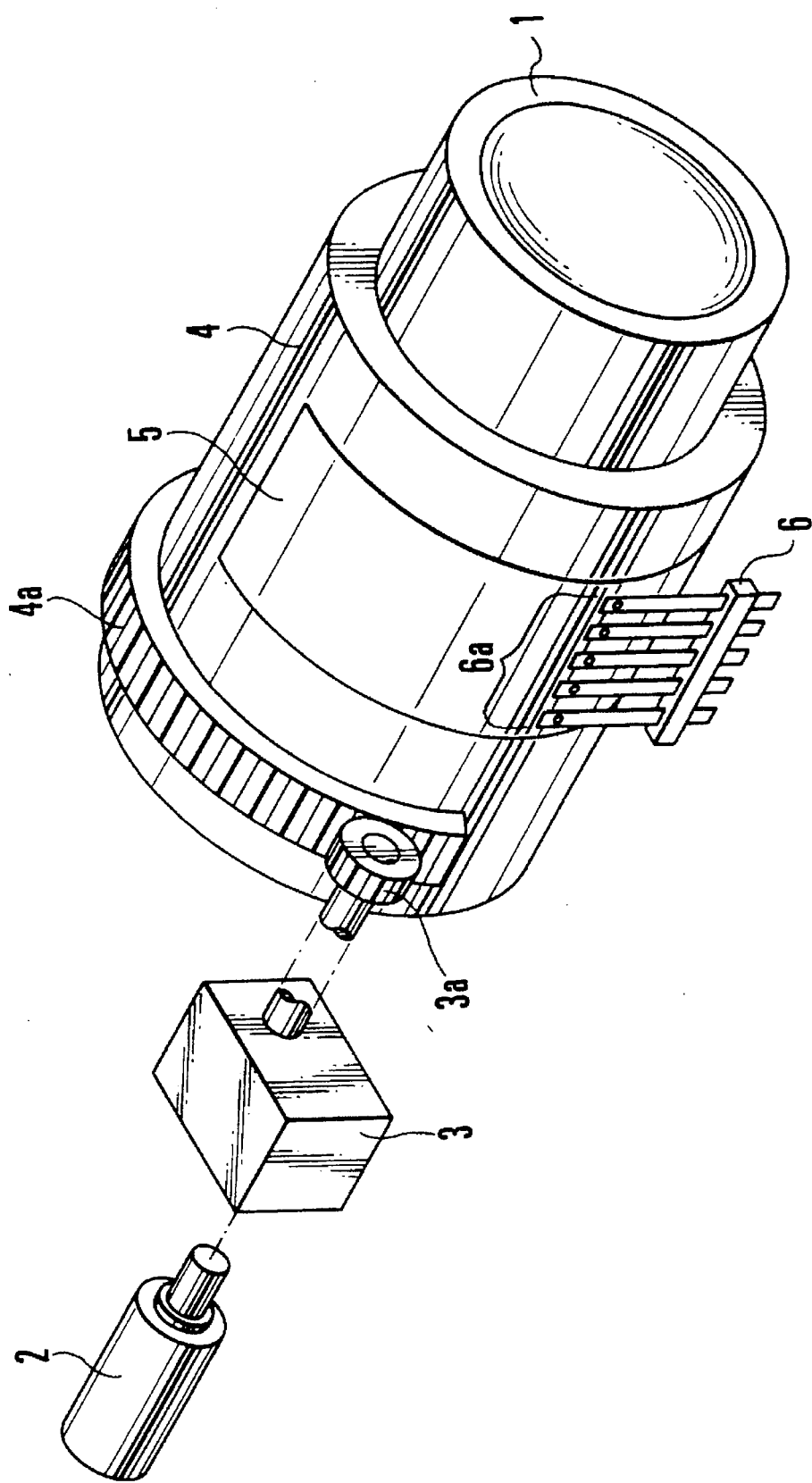
FIG. 5 is an oblique view showing in outline the arrangement of essential parts of a zoom lens mechanism of a camera which is equipped with a conventional coded type position detecting device.
Figure 6:
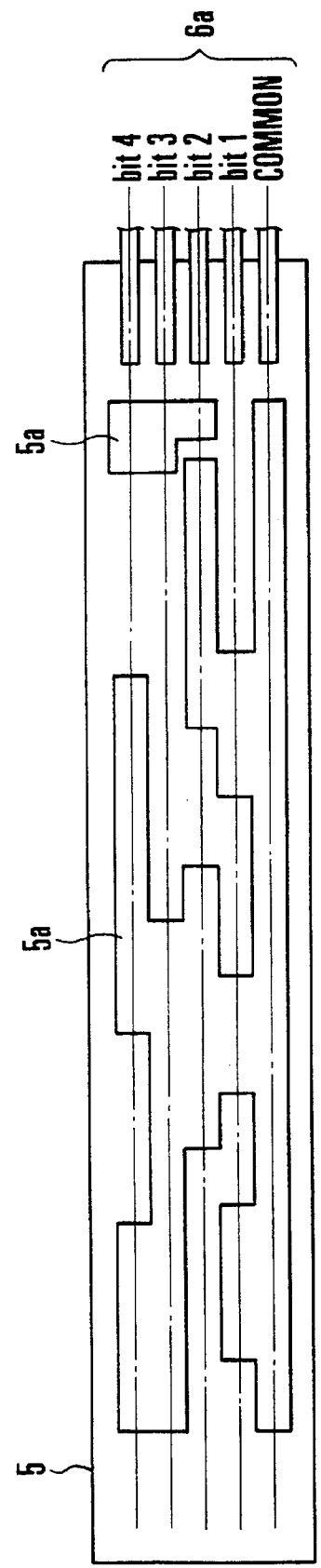
FIG. 6 shows a conductive pattern formed on a conductive pattern plate of the position detecting device of FIG. 5 in relation to a brush which is in sliding contact with the conductive pattern.
Figure 7:
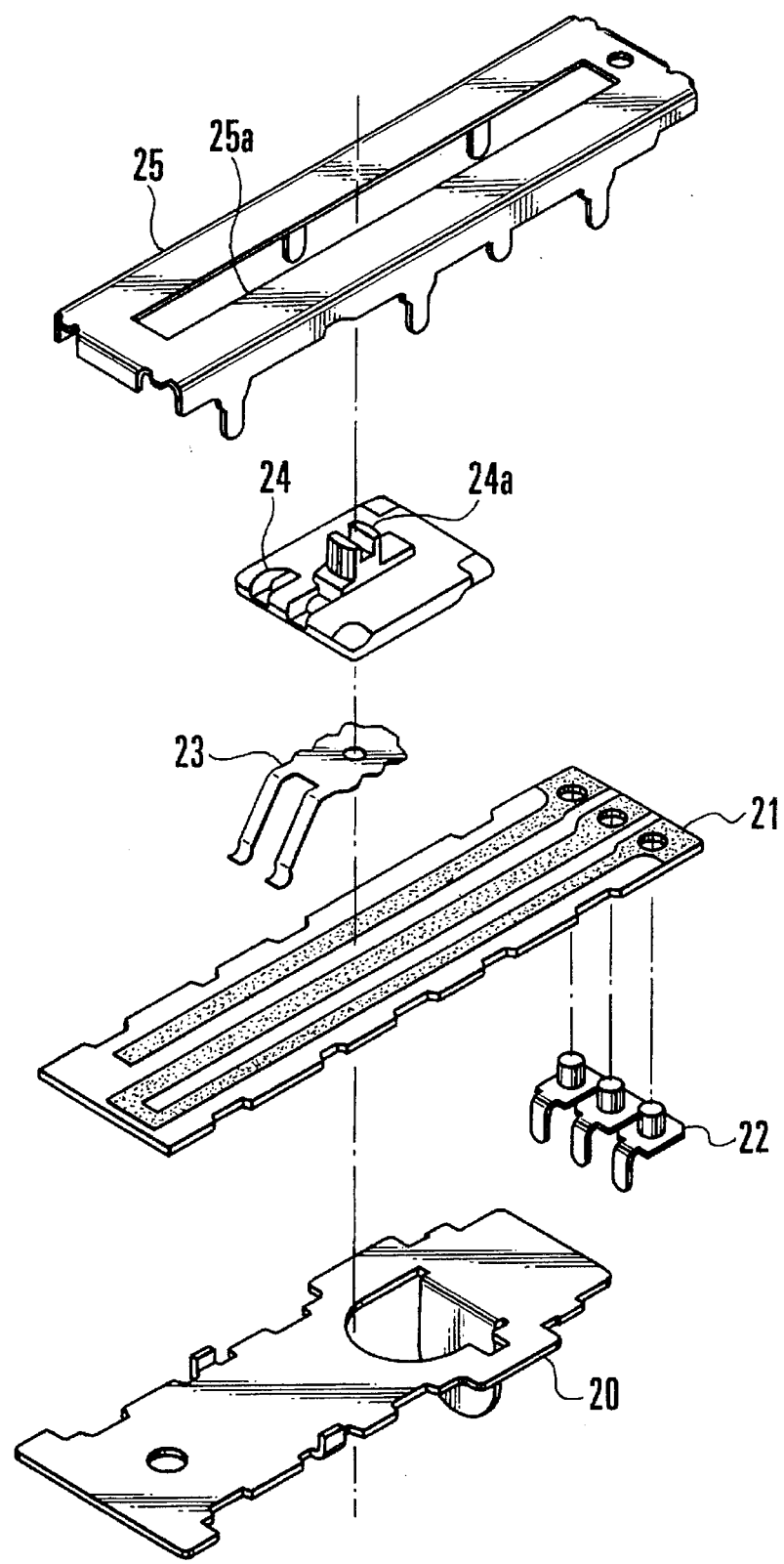
FIG. 7 is an exploded oblique view showing a mechanical structural part of a linear potentiometer which forms a moving body position detecting device previously proposed.

Referring to FIG. 2, a zoom lens barrel 1 is arranged to support a zoom lens and to be movable in the direction of an optical axis, i.e., to be axially movable. A motor 2 is arranged to drive the zoom lens barrel 1. A reduction gear 3 has an output gear 3a. A zoom driving ring 4 is fitted on the lens barrel 1 through a helicoid and is arranged to be only rotatable. A ring gear 4a is secured to the periphery of the zoom driving ring 4 and is arranged to be always in mesh with the output gear 3a. A flexible printed circuit board 10 (hereinafter referred to as a circuit board) has an electric resistance body 50 formed thereon as shown in FIG. 1 and is secured to the outer circumferential surface of the zoom driving ring 4. A brush 11 is secured to a stationary member (not shown) and is arranged to be in sliding contact with the electric resistance body 50.

As shown in FIG. 1, the electric resistance body 50 on the circuit board 10 is formed as a strip-like or linear planar body in a zigzag or flattened-S shape. The electric resistance body 50 has three linear resistance body parts 50a, 50b and 50c which extend in parallel with the moving direction of the moving body (in parallel with the circumferential direction of the zoom driving ring 4 in the case of this embodiment).

The brush 11 has three conductive sliding contact pieces 11a, 11b and 11c which are arranged to be in sliding contact respectively with the resistance body parts 50a, 50b and 50c. A constant voltage source 60 arranged to output a voltage V is connected between the conductive sliding contact pieces 11a and 11c. A voltage detecting means 70 is connected between the conductive sliding contact pieces 11b and 11a. In other words, the embodiment is arranged such that the constant voltage V is applied to both ends of the electric resistance body 50 (a resistor R having a resistance value $R_{AC}$) extending from a contact position (point) A between the conductive sliding contact piece 11a and the resistance body part 50a to a contact position (point) C between the conductive sliding contact piece 11c and the resistance body part 50c, while the voltage detecting means 70 is connected between the conductive sliding contact pieces 11b and 11a.

The highest part of FIG. 1 shows an equivalent circuit of a detecting circuit which includes the conductive sliding contact pieces 11a, 11b and 11c, the electric resistance body 50, the constant voltage source 60 and the voltage detecting means 70 mentioned above. As shown, the resistance $R_{AC}$ of the electric resistance body 50 obtained between the contact position A and the contact position C when the conductive sliding contact pieces 11a, 11b and 11c are respectively at the positions A, B and C is connected to the constant voltage source 60 (output voltage V), so that the constant voltage V is applied across both ends of the resistance $R_{AC}$. The conductive sliding contact piece 11b is connected to act as a sliding terminal for the resistance $R_{AC}$. Meanwhile, the voltage detecting means 70 for detecting a voltage is connected between this sliding terminal and one end of the resistance $R_{AC}$.

Further, the brush 11, the constant voltage source 60 and the voltage detecting means 70 are carried by an immovable body which is not shown. The electrical connection parts for them are all disposed on the side of the immovable body.

In the arrangement described above, when the zoom driving ring 4 is rotated on its axis, the contact positions of the three conductive sliding contact pieces 11a, 11b and 11c on the resistance body parts 50a, 50b and 50c vary accordingly. Then, the voltage detecting means 70 which is connected between the conductive sliding contact pieces 11a and 11b detects a voltage which corresponds to the positions of the conductive sliding contact pieces 11a, 11b and 11c on the resistance body parts 50a, 50b and 50c in the following manner.

Assume that the conductive sliding contact pieces 11a, 11b and 11c are at points A, B and C before the commencement of the rotation of the zoom driving ring 4 and that their positions change respectively to points A', B' and C' at an arbitrary point of time after the commencement of the rotation of the zoom driving ring 4.

The voltage v detected by the voltage detecting means 70 when the conductive sliding contact pieces 11a, 11b and 11c are at the points A, B and C can be expressed as $v=(R_{AB}/R_{AC})V$, wherein $R_{AB}$ represents the resistance value of the resistance body 50 between the points A and B.

The voltage v' detected by the voltage detecting means 70 when the conductive sliding contact pieces 11a, 11b and 11c has moved respectively to the points A', B' and C' can be expressed as $v'=(R_{A'B'}/R_{A'C'})V$.

Assuming that a distance to which each of the conductive sliding contact pieces 11a, 11b and 11c has moved is X and the specific resistance (a resistance value per unit length) of each of the resistance body parts 50a, 50b and 50c is $\alpha$, the resistance value of the resistance body part 50c which is in contact with the conductive sliding contact piece 11c increases by an amount $\alpha X$, by which the resistance value of the resistance body part 50a which is in contact with the conductive sliding contact piece 11a has decreased. Hence, there is obtained the following relation: $R_{A'C'}=R_{AC}+\alpha X-\alpha X=R_{AC}$. The resistance value of a part from the point A' to the point C' is therefore the same as the resistance value of a part from the point A to the point C.

On the other hand, since the resistance value of the resistance body part 50a which is in contact with the sliding contact piece 11a decreases by the amount $\alpha X$ and that of the resistance body part 50b which is in contact with the sliding contact piece 11b also decreases by the amount $\alpha X$, the resistance value of a part from the point A' to the point B' can be expressed as $R_{A'B'}=R_{AB}-\alpha x-\alpha x=R_{AB}-2\alpha x$.

The voltage value v', therefore, becomes as expressed below:

$$v' = (R_{A'B'}/R_{A'C'})V = \{(R_{AB} - 2\alpha X)/R_{AC}\}V$$
$$= v - (2\alpha X/R_{AC})V$$

In other words, the output voltage of the voltage detecting means 70 linearly varies for the amount of movement X. In accordance with the arrangement of this (first) embodiment, therefore, the rotating position of the zoom driving ring 4 can be continuously and linearly detected instead of detecting it intermittently.

(Second Embodiment)

A moving body position detecting device according to a second embodiment of this invention is described with reference to FIG. 3 as follows.

In the case of the second embodiment, a linear, high resistance body 15b is formed on the surface of a flexible printed circuit board 15 which is mounted on the above-stated zoom driving ring 4 (i.e., the moving body). A first conductive body (a low resistance body) 15a is connected to one end of the high resistance body 15b and extends in parallel to the high resistance body 15b. A second conductive body (another low resistance body) 15c is connected to the other end of the high resistance body 15b and extends also in parallel to the high resistance body 15b. In other words, the second embodiment is arranged by replacing all the parts except the middle part of the linear resistance body of the first embodiment with conductive bodies having a low resistance.

A brush 11 has conductive sliding contact pieces 11a, 11b and 11c which are arranged to be respectively in contact with the high resistance body 15b and the conductive bodies 15a and 15c. The arrangement of the brush 11 is the same as that of the first embodiment. A constant voltage source 60 arranged to output a voltage V is connected between the conductive sliding contact pieces 11a and 11c. The voltage source 60 is arranged in parallel to the resistance $R_{AC}$ of a part from a point A at which the conductive sliding contact piece 11a is in contact to a point C at which the conductive sliding contact piece 11c is in contact. Further, the conductive sliding contact piece 11b which relatively slides over the high resistance body 15b is arranged to act as a sliding terminal for the above-stated resistance $R_{AC}$.

The brush 11, the constant voltage source 60 and the voltage detecting means 70 are carried by an immovable body also in the case of the first embodiment.

The positions of the three conductive sliding contact pieces 11a, 11b and 11c relative to the circuit board 15 in the arrangement described above vary when a moving body which is not shown moves. Then, at the voltage detecting means 70 which is connected between the conductive sliding contact pieces 11a and 11b, a voltage corresponding to the positions of the conductive sliding contact pieces 11a, 11b and 11c on the resistance bodies 15a, 15b and 15c is detected in the following manner.

Assume that the positions of the conductive sliding contact pieces 11a, 11b and 11c before the moving body begins to move are respectively at points A, B and C as shown in FIG. 3 and that their positions respectively change to points A', B' and C' on the circuit board 15 at an arbitrary point of time after the moving body begins to move.

The voltage v detected by the voltage detecting means 70 when the conductive sliding contact pieces 11a, 11b and 11c are at the point A, B and C can be expressed as follows:

$v=(R_{AB}/R_{AC})V$ (wherein $R_{AB}$ represents a resistance value of a part between the points A and B)

The voltage v' detected by the voltage detecting means 70 when the conductive sliding contact pieces 11a, 11b and 11c has relatively moved to the points A', B' and C' can be expressed as follows:

$$v' = (R_{A'B}/R_{A'C})V$$

Assuming that a distance to which each of the conductive sliding contact pieces 11a, 11b and 11c moves is assumed to be X, the specific resistance (a resistance value per unit length) of the high resistance body 15b to be α and the resistance values of the conductive bodies 15a and 15c to be negligibly small, the resistance value $R_{A'C}$, is equal to the value $R_{AC}$. In other words, the resistance value of a part from the point A' to the point C' is equal to the resistance value of a part from the point A to the point C.

On the other hand, since the resistance value of the resistance body 15b with which the sliding contact piece 11b is in contact decreases by αX, the resistance value $R_{A'B}$ of a part from the point A' to the point B' is expressed as $R_{A'B}=R_{AB}-\alpha X$.

Therefore, the voltage v' becomes:

$$\begin{aligned}v' &= (R_{A'B}/R_{A'C})V = \{(R_{AB} - \alpha X)/R_{AC}\}V \\ &= v - (\alpha X/R_{AC})V\end{aligned}$$

In other words, the voltage outputted linearly varies relative to the amount of movement (distance) X. In accordance with the arrangement of the second embodiment, therefore, the moving position of the moving body can be continuously and linearly detected instead of being intermittently detected.

(Third Embodiment)

A third embodiment of this invention is next described with reference to FIGS. 4(a), 4(b) and 4(c).

In the third embodiment, a resistance body 40 which is formed in a zigzag shape on a flexible printed circuit board 30 is made of one and the same material all over, including resistance body parts 40a, 40b and 40c. However, the third embodiment differs from the first embodiment in that the middle resistance body part 40b has a narrower width than the other resistance body parts 40a and 40c which are located on both sides of the resistance body part 40b. In other words, the middle resistance body part 40b is arranged to have a larger specific resistance than the other resistance body parts 40a and 40c located on both sides. With the exception of this point, the third embodiment is arranged in the same manner as the first embodiment.

A brush 31 includes a conductive sliding contact piece 31b which is arranged to be in sliding contact only with the resistance body part 40b, a conductive sliding contact piece 31a which is arranged to be in sliding contact only with the resistance body part 40a and a conductive sliding contact piece 40c which is arranged to be in sliding contact only with the resistance body part 40c. A constant voltage source 60 which generates a constant voltage V is connected between the conductive sliding contact pieces 31a and 31c. The conductive sliding contact pieces 31a, 31b and 31c act as sliding terminals on the resistance $R_{AC}$ of the resistance body 40 within a range from a point A to a point C. A voltage detecting means 70 is arranged to detect voltages obtained at the positions of the sliding terminals. The brush 31, the constant voltage source 60 and the voltage detecting means 70 are carried by an immovable body.

In the above-stated arrangement, when a moving body which is not shown moves, the positions of the conductive sliding contact pieces 31a, 31b and 31c vary respectively from points A, B and C to points A', B' and C'. Assuming that the specific resistance of the middle resistance body part 40b is γ and the specific resistance of each of the resistance body parts 40a and 40c on both sides is β, the voltage to be detected by the voltage detecting means 70 varies in the following manner.

The voltage v detected by the voltage detecting means 70 when the brush 31 is in its initial position which is at the points A, B and C can be expressed as $v = (R_{AB}/R_{AC})V$.

When the brush 31 relatively moves as much as a distance X to come to a position obtained at the points A', B' and C', the voltage v detected by the voltage detecting means 70 becomes as follows: With the position of the conductive sliding contact piece 31a changed from the point A to the point A', the resistance value decreases by βX. With the conductive sliding contact piece 31c moved to the right over the resistance body part 40c as much as the distance X, the resistance value increases by βX. With the conductive sliding contact piece 31b moved to the right over the resistance body part 40b as much as the distance X, the resistance value decreases by γX. The resistance value $R_{A'C}$ thus obtained can be expressed as $R_{A'C}=R_{AC}-\beta X+\beta X=R_{AC}$. The resistance value $R_{A'B}$ then can be also expressed as $R_{A'B}=R_{AB}-\beta X-\gamma X=R_{AB}-(\beta+\gamma)X$.

Therefore, the voltage v' can be expressed as follows:

$$\begin{aligned}v' &= (R_{A'B}/R_{A'C})V = \{R_{AB}-(\beta+\gamma)X\}V/R_{AC} \\ &= v-(\beta+\gamma)XV/R_{AC}\end{aligned} \quad (1)$$

As apparent from the above formula (1), when the brush 31 moves over the resistance body 40 relative to the latter, the voltage outputted linearly varies in proportion to the moving distance. Therefore, according to the arrangement of the third embodiment, the moving position of the moving body is continuously and linearly detectable, instead of being intermittently detected.

Further, with all the parts of the resistance body made of one and the same material as in the case of the embodiment described above, the specific resistance of the middle linear resistance body part and those of the resistance body parts on both sides of the middle part are determined solely by their dimensions. This assertion is briefly verified as follows:

Assume that the conductive sliding contact pieces 31a, 31b and 31c of the brush 31 move from the points A, B and C respectively to points A", B" and C", as shown in FIG. 4(c). The resistance value $R_{AC}$ of a part between the points A and C can be expressed as follows.

$$R_{AC}=\beta L+\gamma L+2R'=(\beta+\gamma)L+2R' \quad (2)$$

wherein: L represents the length of each of the conductive sliding contact pieces 31a, 31b and 31c, and R' represents the resistance value of the resistance body 40 obtained for each of parts between the points B and C and between the points A and B.

In the third embodiment, with the width of each of the resistance body parts 40a and 40c assumed to be twice as large as that of the width of the resistance body part 40b, the specific resistance γ of the middle resistance body 40b can be expressed as γ=2β. Then, the formula (2) shown above can be expressed as follows:

$$R_{AC}=3\beta L+2R' \quad (3)$$

In the first embodiment described in the foregoing, all the parts of the resistance body 50 are not only made of one and the same material but also formed to be of the same dimensions. For the first embodiment, therefore, a relation of α=β=γ is substituted in the formula (2) to express the resistance value $R_{AC}$ as follows:

$$R_{AC}=2\alpha L+2R' \quad (4)$$

Assuming that the total resistance of the resistance body 50 of the first embodiment is equal to that of the resistance body 40 of the third embodiment, there is established a relation of the formula (3)=the formula (4). Then, there is obtained a relation $3\beta L+2R'=2\alpha L+2R'$. Therefore, the specific resistance $\alpha$ can be expressed as follows:

$$\alpha=3\beta/2 \quad (5)$$

By substituting the formula (5) for the formula shown in the foregoing description of the first embodiment, the detection voltage $v_1$ in the first embodiment becomes as shown below:

$$v_1=v-3\beta VX/R_{AC}$$

Then, since the detection voltage $v_2$ in the third embodiment is expressed as $v_2=v-3\beta VX/R_{AC}$, it is apparent that the results of detection obtained by the third embodiment are the same as those detected by the first embodiment.

Further, in each of the embodiments described above, the resistance bodies are formed in linear shapes and arranged in parallel to each other. However, according to this invention, they may be formed in curved shapes and arranged in parallel to each other. The terms "in parallel" as used in the appended claims include these linear shapes.

In accordance with this invention, any resistance body may be used irrespective of its specific resistance. In the appended claims, these resistance bodies are expressed as conductors in general.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

This invention may be carried out by combining as necessary the embodiments or their technological elements described in the foregoing.

This invention applies to cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming them.

What is claimed is:

1. A moving body position detecting device for detecting a position of a moving body, comprising:
    a) three contacts; and
    b) a conductive member defining three conductive paths being respectively in contact with said three contacts, for detecting the position of said moving body according to relative positional relationships of said three conductive paths with respect to said three contacts, said three conductive paths being connected electrically in series with one another and disposed spatially in parallel with one another.

2. A device according to claim 1, further comprising circuit means connected to said three contacts for indicating detected positions.

3. A device according to claim 2, wherein said three contacts are disposed with an immovable body.

4. A device according to claim 3, wherein said three conductive paths are disposed with said moving body.

5. A device according to claim 3, further comprising:
    a constant voltage source connected between a first contact and a second contact included in said three contacts; and
    wherein said circuit means includes a voltage detector connected between a third contact and said first contact included in said three contacts.

6. A device according to claim 3, further comprising:
    a constant voltage source connected between a first contact and a second contact which are located on two sides among said three contacts; and
    wherein said circuit means includes a voltage detector connected between said first contact and a third contact which is located in the middle of said three contacts.

7. A device according to claim 1, wherein conductive paths located on two sides among said three conductive paths are arranged to have specific resistances lower than a specific resistance of a conductive path located in the middle of said three conductive paths.

8. A device according to claim 1, wherein conductive paths located on two sides among said three conductive paths are arranged to be wider than a conductive path located in the middle of said three conductive paths.

9. A device according to claim 1, wherein said three conductive paths are formed with a flexible printed circuit board.

10. A device according to claim 1, wherein said moving body includes a constituent element of an optical apparatus.

11. A device according to claim 1, wherein said moving body includes an optical system of a camera.

12. A device according to claim 1, wherein said moving body includes a zoom lens of a camera.

13. A device according to claim 1, wherein said moving body is rotatable, and wherein said three conductive paths are arranged to extend in a rotating direction of said moving body.

14. An apparatus having a moving body, comprising:
    a) three contacts; and
    b) a conductive member defining three conductive paths being respectively in contact with said three contacts, for detecting a position of said moving body according to relative positional relationships of said three conductive paths with respect to said three contacts, said three conductive paths being connected electrically in series with one another and disposed spatially in parallel with one another.

15. An apparatus according to claim 14, wherein said apparatus includes an optical apparatus.

16. An apparatus according to claim 14, further comprising circuit means connected to said three contacts for indicating detected positions.

17. An apparatus according to claim 16, wherein said three contacts are disposed with an immovable body.

18. An apparatus according to claim 17, wherein said three conductive paths are disposed with said moving body.

19. An apparatus according to claim 17, further comprising:
   a constant voltage source connected between a first contact and a second contact included in said three contacts; and
   wherein said circuit means includes a voltage detector connected between a third contact and said first contact included in said three contacts.

20. An apparatus according to claim 17, further comprising:
   a constant voltage source connected between a first contact and a second contact which are located on two sides among said three contacts; and
   wherein said circuit means includes a voltage detector connected between said first contact and a third contact which is located in the middle of said three contacts.

21. An apparatus according to claim 14, wherein conductive paths located on two sides among said three conductive paths are arranged to have specific resistances lower than a specific resistance of a conductive path located in the middle of said three conductive paths.

22. An apparatus according to claim 14, wherein conductive paths located on two sides among said three conductive paths are arranged to be wider than a conductive path located in the middle of said three conductive paths.

23. An apparatus according to claim 14, wherein said three conductive paths are formed with a flexible printed circuit board.

24. An apparatus according to claim 14, wherein said moving body includes a constituent element of an optical apparatus.

25. An apparatus according to claim 14, wherein said moving body includes an optical system of a camera.

26. An apparatus according to claim 14, wherein said moving body includes a zoom lens of a camera.

27. An apparatus according to claim 14, wherein said moving body is rotatable, and wherein said three conductive paths are arranged to extend in a rotating direction of said moving body.

28. A moving body position detecting device for detecting a position of a moving body, comprising:
   a) a substrate and an electrically conductive member defining a plurality of conductive paths electrically continuous with one another and disposed spatially in parallel with one another on said substrate; and
   b) electrical contacts in number equal to the number of conductive paths in said plurality, said contacts being electrically separate from one another, each of said contacts engaging a single one of said conductive paths,
   different relative positional relationships existing as between said electrical contacts and said conductive paths during movement of said moving body.

29. A device according to claim 28, further including a source of voltage connected to selective of said contacts.

30. A device according to claim 29, further including a voltage indicator connected to selective of said contacts.

31. A device according to claim 29, wherein said selective contacts are contacts engaging non-adjacent ones of said conductive paths.

32. A device according to claim 30, wherein said selective contacts are contacts engaging adjacent ones of said conductive paths.

33. A device according to claim 28, further including a source of voltage connected to contacts which are in engagement with non-adjacent ones of said conductive paths and a voltage indicator connected to contacts which are in engagement with adjacent ones of said conductive paths.

34. A moving body position detecting device for detecting a position of a moving body in a given range of movement of said moving body, comprising:
   a) a plurality of contacts; and
   b) a conductive member defining a plurality of conductive paths in number corresponding with the number of the contact plurality, said conductive paths being electrically series-connected with one another,
   each of said contacts being in electrical engagement with a distinct one of said conductive paths throughout movement of said moving body in said given range.

35. An apparatus having:
   (a) a moving body; and
   (b) a detecting device for detecting a position of a moving body in a given range of movement of said moving body, said detecting device comprising a plurality of contacts and a conductive member defining a plurality of conductive paths in number corresponding with the number of the contact plurality, said conductive paths being electrically series-connected with one another, each of said contacts being in electrical engagement with a distinct one of said conductive paths throughout movement of said moving body in said given range.

\* \* \* \* \*